United States Patent
Kuwayama

(10) Patent No.: US 10,556,466 B2
(45) Date of Patent: Feb. 11, 2020

(54) TIRE

(71) Applicant: BRIDGESTONE CORPORATION, Chuo-ku, Tokyo (JP)

(72) Inventor: Isao Kuwayama, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/029,340

(22) PCT Filed: Jul. 7, 2014

(86) PCT No.: PCT/JP2014/003595
§ 371 (c)(1),
(2) Date: Apr. 14, 2016

(87) PCT Pub. No.: WO2015/063977
PCT Pub. Date: May 7, 2015

(65) Prior Publication Data
US 2016/0257168 A1    Sep. 8, 2016

(30) Foreign Application Priority Data
Oct. 29, 2013    (JP) .................................. 2013-224530

(51) Int. Cl.
*B60C 9/20* (2006.01)
*B60C 9/22* (2006.01)
*B60C 9/02* (2006.01)

(52) U.S. Cl.
CPC ................. *B60C 9/20* (2013.01); *B60C 9/02* (2013.01); *B60C 9/22* (2013.01);
(Continued)

(58) Field of Classification Search
CPC ................ B60C 9/20; B60C 9/02; B60C 9/22
See application file for complete search history.

(56) References Cited

U.S. PATENT DOCUMENTS

| 3,175,598 | A | * | 3/1965 | Cegnar | ..................... | B60C 9/20 |
| | | | | | | 152/535 |
| 3,339,610 | A | * | 9/1967 | Fausti | ...................... | B60C 3/06 |
| | | | | | | 152/455 |

(Continued)

FOREIGN PATENT DOCUMENTS

| CN | 102548775 A | 7/2012 |
| CN | 103068594 A | 4/2013 |

(Continued)

OTHER PUBLICATIONS

Clark, S. "Mechanics of Pneumatic Tires, Monograph 122. uo: National Bureau of Standards." (1971).*
English translation of JP 2012171423 A (Year: 2012).*

*Primary Examiner* — Matthew J Daniels
*Assistant Examiner* — Nicholas R Krasnow
(74) *Attorney, Agent, or Firm* — Kenja IP Law PC

(57) ABSTRACT

A tire comprising: a carcass; and inclined belt layers and a circumferential belt layer, wherein: the circumferential belt layer satisfies a correlation that $X \geq 750$ when it is defined that $X = Y \times n \times m$, where Y is a Young's modulus in GPa of the cords forming the circumferential belt layer, n is a number of the cords implanted per 50 mm of width, and m is a number of layers of the circumferential belt layer; the inclined belt layers comprise at least two inclined belt layers having different tire widthwise widths; and a tire widthwise width $W_1$ of an inclined belt layer having a widest width and a tire widthwise width $W_2$ of an inclined belt layer having a narrowest width satisfy a correlation that $W_2 \leq 0.6 W_1$.

8 Claims, 7 Drawing Sheets

(52) U.S. Cl.
CPC .......... B60C 2009/208 (2013.01); B60C 2009/2016 (2013.01); B60C 2009/2019 (2013.01); B60C 2009/2083 (2013.01); B60C 2009/2223 (2013.01); B60C 2009/2261 (2013.01); B60C 2009/2266 (2013.01)

(56) References Cited

U.S. PATENT DOCUMENTS

| | | | | |
|---|---|---|---|---|
| 3,623,529 A * | 11/1971 | Fausti | B60C 9/2006 | 152/528 |
| 3,703,202 A * | 11/1972 | Maiocchi | B60C 9/2006 | 152/175 |
| 4,140,168 A * | 2/1979 | Caretta | B60C 9/2009 | 152/527 |
| 4,161,203 A * | 7/1979 | Suzuki | B60C 9/2009 | 152/527 |
| 4,506,718 A * | 3/1985 | Abe | B60C 9/0007 | 152/527 |
| 4,633,926 A * | 1/1987 | Tamura | B60C 9/20 | 152/209.1 |
| 4,869,307 A * | 9/1989 | Bormann | B60C 9/2009 | 152/533 |
| 5,024,261 A * | 6/1991 | Igarashi | B60C 9/0007 | 152/451 |
| 5,111,863 A * | 5/1992 | Nakasaki | B60C 9/20 | 152/526 |
| 5,154,217 A * | 10/1992 | Kanamaru | B60C 9/2009 | 152/527 |
| 5,188,685 A * | 2/1993 | Cherveny | B60C 9/0007 | 152/451 |
| 5,332,017 A * | 7/1994 | Imamiya | B60C 9/2006 | 152/526 |
| 5,385,193 A * | 1/1995 | Suzuki | B60C 9/14 | 152/525 |
| 5,695,578 A * | 12/1997 | Boiocchi | B60C 9/1821 | 152/458 |
| 5,795,418 A * | 8/1998 | Suzuki | B60C 9/09 | 152/526 |
| 5,902,425 A * | 5/1999 | Armellin | B60C 9/22 | 152/454 |
| 5,975,175 A * | 11/1999 | Armellin | B60C 9/22 | 152/454 |
| 6,070,631 A * | 6/2000 | Armellin | B60C 3/04 | 152/209.11 |
| 6,257,291 B1 * | 7/2001 | Boiocchi | B29C 70/20 | 152/527 |
| 6,533,012 B1 * | 3/2003 | Jardine | B60C 9/22 | 152/526 |
| 9,327,557 B2 * | 5/2016 | Gatti | B60C 9/06 | |
| 9,783,003 B2 * | 10/2017 | Kotoku | B60C 9/18 | |
| 2002/0014295 A1 | 2/2002 | Tanaka | B60C 17/0009 | 152/520 |
| 2005/0000617 A1 * | 1/2005 | Tsuruta | B60C 9/18 | 152/531 |
| 2005/0194081 A1 * | 9/2005 | Yano | B29D 30/0661 | 152/527 |
| 2006/0032570 A1 * | 2/2006 | Callamand | B60C 9/2006 | 152/532 |
| 2006/0169381 A1 * | 8/2006 | Radulescu | B60C 9/2006 | 152/531 |
| 2007/0221309 A1 * | 9/2007 | Cohen | B60C 9/20 | 152/532 |
| 2009/0139626 A1 * | 6/2009 | Ozaki | B60C 9/0042 | 152/527 |
| 2010/0065181 A1 * | 3/2010 | Terada | B60C 9/2009 | 152/531 |
| 2010/0071826 A1 * | 3/2010 | Yokokura | B60C 9/0042 | 152/527 |
| 2010/0089511 A1 * | 4/2010 | Terada | B60C 9/2009 | 152/527 |
| 2010/0263780 A1 * | 10/2010 | Mafune | B29D 30/3028 | 152/541 |
| 2010/0282392 A1 * | 11/2010 | Deal | B60C 9/23 | 152/551 |
| 2012/0180925 A1 * | 7/2012 | Yoshikawa | B29D 30/1635 | 152/526 |
| 2012/0211138 A1 * | 8/2012 | Johnson | B60C 15/06 | 152/526 |
| 2012/0267019 A1 * | 10/2012 | Gatti | B60C 9/06 | 152/209.18 |
| 2014/0261952 A1 * | 9/2014 | Tanaka | B60C 9/2009 | 152/535 |
| 2014/0299247 A1 * | 10/2014 | Hasegawa | B60C 11/0083 | 152/454 |
| 2014/0305566 A1 * | 10/2014 | Mashiyama | B60C 9/18 | 152/454 |
| 2014/0311642 A1 * | 10/2014 | Nagayoshi | B60C 11/04 | 152/209.24 |
| 2014/0326375 A1 * | 11/2014 | Okabe | B60C 9/0007 | 152/154.2 |
| 2014/0332130 A1 * | 11/2014 | Maehara | B60C 9/2204 | 152/209.1 |
| 2014/0332137 A1 * | 11/2014 | Besson | B60C 9/0007 | 152/527 |
| 2014/0345766 A1 | 11/2014 | Wang et al. | | |
| 2014/0373992 A1 * | 12/2014 | Ishizaka | B60C 9/2006 | 152/527 |
| 2015/0136296 A1 * | 5/2015 | Kotoku | B60C 11/0083 | 152/531 |
| 2015/0136297 A1 * | 5/2015 | Iga | B60C 11/0306 | 152/531 |
| 2015/0258856 A1 * | 9/2015 | Nagayoshi | B60C 11/01 | 152/527 |
| 2015/0283859 A1 * | 10/2015 | Aksoy | B60C 5/00 | 152/527 |
| 2015/0328929 A1 * | 11/2015 | Sugiyama | B60C 9/023 | 152/558 |
| 2015/0328930 A1 * | 11/2015 | Kobayashi | B60C 11/04 | 152/209.18 |
| 2015/0360516 A1 * | 12/2015 | Mori | B60C 9/2006 | 152/535 |
| 2016/0272007 A1 * | 9/2016 | Hatanaka | B60C 9/28 | |
| 2016/0280010 A1 * | 9/2016 | Kuwayama | B60C 9/2009 | |
| 2017/0225513 A1 * | 8/2017 | Tashiro | B60C 9/20 | |
| 2018/0056723 A1 * | 3/2018 | Domingo | B60C 9/20 | |

FOREIGN PATENT DOCUMENTS

| | | |
|---|---|---|
| EP | 1710097 A1 | 10/2006 |
| EP | 1852276 A1 | 11/2007 |
| EP | 2583837 A1 | 4/2013 |
| EP | 2774780 A1 | 9/2014 |
| JP | 2000203212 A | 7/2000 |
| JP | 2001-301421 A | 10/2001 |
| JP | 2002307910 A | 10/2002 |
| JP | 2003-154808 A | 5/2003 |
| JP | 2006-193032 A | 7/2006 |
| JP | 2007-045334 A | 2/2007 |
| JP | 2009012547 A | 1/2009 |
| JP | 2009-154685 A | 7/2009 |
| JP | 2012-171423 A | 9/2012 |
| WO | WO-8000236 A1 * | 2/1980 .............. B60B 9/00 |
| WO | WO-2012176476 A1 * | 12/2012 .............. B60C 3/04 |
| WO | 2013021499 A1 | 2/2013 |
| WO | 2013065322 A1 | 5/2013 |
| WO | WO-2013065322 A1 * | 5/2013 ......... B60C 11/0083 |

* cited by examiner

⇐ Lateral Force

TIRE

TECHNICAL FIELD

This disclosure relates to a tire having increased cornering power.

BACKGROUND

Conventionally, it is known to dispose as reinforcing members of tire an inclined belt layer having cords inclined with respect to a tire circumferential direction, and a circumferential belt layer having cords extending along the tire circumferential direction, on a tire radial outer side of a crown portion of a carcass extending between bead portions.

On the other hand, it is known that degree of cornering power exhibited during cornering of a vehicle is an indicator for vehicle steering stability, and ordinarily, a tire having a high cornering power is excellent in steering stability. Here, in order to increase the cornering power, for example, one might consider enhancing stiffness of the aforementioned circumferential belt layer, so as to improve stiffness of a tire ring, etc.

SUMMARY

Technical Problem

However, it has been discovered that in such tire having improved ring stiffness, although the cornering power is improved, a difference is generated in degree of the exhibited cornering power, depending on degree of load on the tire. In particular, there was a probability that in a vehicle having a great difference between load on front wheels and load on rear wheels of the vehicle, a great difference is generated between degree of the cornering power obtained in the front wheels and in the rear wheels, which results in bad feeling of balance during cornering of a vehicle.

Thus, this disclosure is to provide a tire having increased cornering power and reduced load dependence thereof.

Solution to Problem

Having intensively studied solution to the problem, we have discovered that in a tire having improved ring stiffness, when load on the tire is small, a phenomenon occurs such that a part of the tread surface rises above the road surface in a tread shoulder region during cornering of a vehicle, and such phenomenon results in load dependence to exhibition of cornering power. Then, we have achieved this disclosure via various trials and errors in order to avoid this phenomenon of rise of the tread surface.

The subject of this disclosure is as follows.

(1) The tire of this disclosure includes a carcass toroidally extending between a pair of bead portions; and inclined belt layers having cords inclined with respect to a tire circumferential direction and a circumferential belt layer having cords extending along the tire circumferential direction, the inclined belt layers and the circumferential belt layer being disposed on a tire radial outer side of a crown portion of the carcass, wherein: the circumferential belt layer satisfies a correlation that $X \geq 750$ when it is defined that $X = Y \times n \times M$, where Y is a Young's modulus in GPa of the cords forming the circumferential belt layer, n is a number of the cords implanted per 50 mm of width, and m is a number of layers of the circumferential belt layer; the inclined belt layers comprise at least two inclined belt layers having different tire widthwise widths; and a tire widthwise width $W_1$ of an inclined belt layer having a widest width and a tire widthwise width $W_2$ of an inclined belt layer having a narrowest width satisfy a correlation that $W_2 \leq 0.6 \, W_1$.

According to the tire of this disclosure which has such configuration, it is possible to improve stiffness of the circumferential belt layer, improve ring stiffness of the tire, and thereby increase cornering power and reduce load dependence of cornering power.

Here, "extending along the tire circumferential direction" is inclusive of cases where the cords are parallel to the tire circumferential direction, and cases where the cords are slightly inclined with respect to the tire circumferential direction (an inclination angle with respect to the tire circumferential direction being 5° or less) as a result of forming a belt layer by spiral winding a strip having cords coated with rubber.

The Young's modulus refers to a Young's modulus with respect to the tire circumferential direction, and is determined according to JIS L1017 8.8 (2002) by testing according to JIS L1017 8.5 a) (2002). Here, measurement of the Young's modulus can be performed by cutting out the cords from the tire after molding and vulcanization.

The tire of this disclosure is provided for use by mounting to an applicable rim. The "applicable rim" is a valid industrial standard for the region in which the tire is produced or used, and refers to a standard rim of an applicable size (the "Measuring Rim" in the STANDARDS MANUAL of ETRTO, and the "Design Rim" in the "YEAR BOOK" of TRA) according to the "JATMA Year Book" in Japan, the "ETRTO STANDARD MANUAL" in Europe, or the "TRA YEAR BOOK" in the United States of America.

The tire widthwise widths, etc. of the inclined belt layers and the circumferential belt layer in this disclosure refer to values measured at an unloaded state, in which the tire is mounted to the applicable rim, while an air pressure corresponding to a maximum load capability at an applicable size and ply rating as described in JATMA, etc. (hereinafter referred to as "predetermined air pressure") is filled.

(2) The tire of this disclosure preferably satisfies a correlation that $W_2 \geq 0.25 \, W_1$. According to this configuration, the cornering power can be increased sufficiently.

(3) The tire of this disclosure preferably satisfies correlations that $30° \leq \theta_1 \leq 85°$, $10° \leq \theta_2 \leq 30°$, and $\theta_1 > \theta_2$, where $\theta_1$ is an inclination angle with respect to the tire circumferential direction of the cords forming the inclined belt layer having the widest width, and $\theta_2$ is an inclination angle with respect to the tire circumferential direction of the cords forming the inclined belt layer having the narrowest width. According to this configuration, out-of-plane bending stiffness of the tire is appropriately reduced, contact length of the tread surface is increased, and thus the cornering power can be further increased.

(4) In the tire of this disclosure, the inclined belt layers preferably consist of only a wide-width inclined belt layer and a narrow-width inclined belt layer. According to this configuration, it is possible to ensure sufficient durability, and simultaneously reduce the weight of the tire.

Advantageous Effect

According to this disclosure, it is possible to provide a tire having increased cornering power and reduced load dependence thereof.

DETAILED DESCRIPTION

Figure 1:
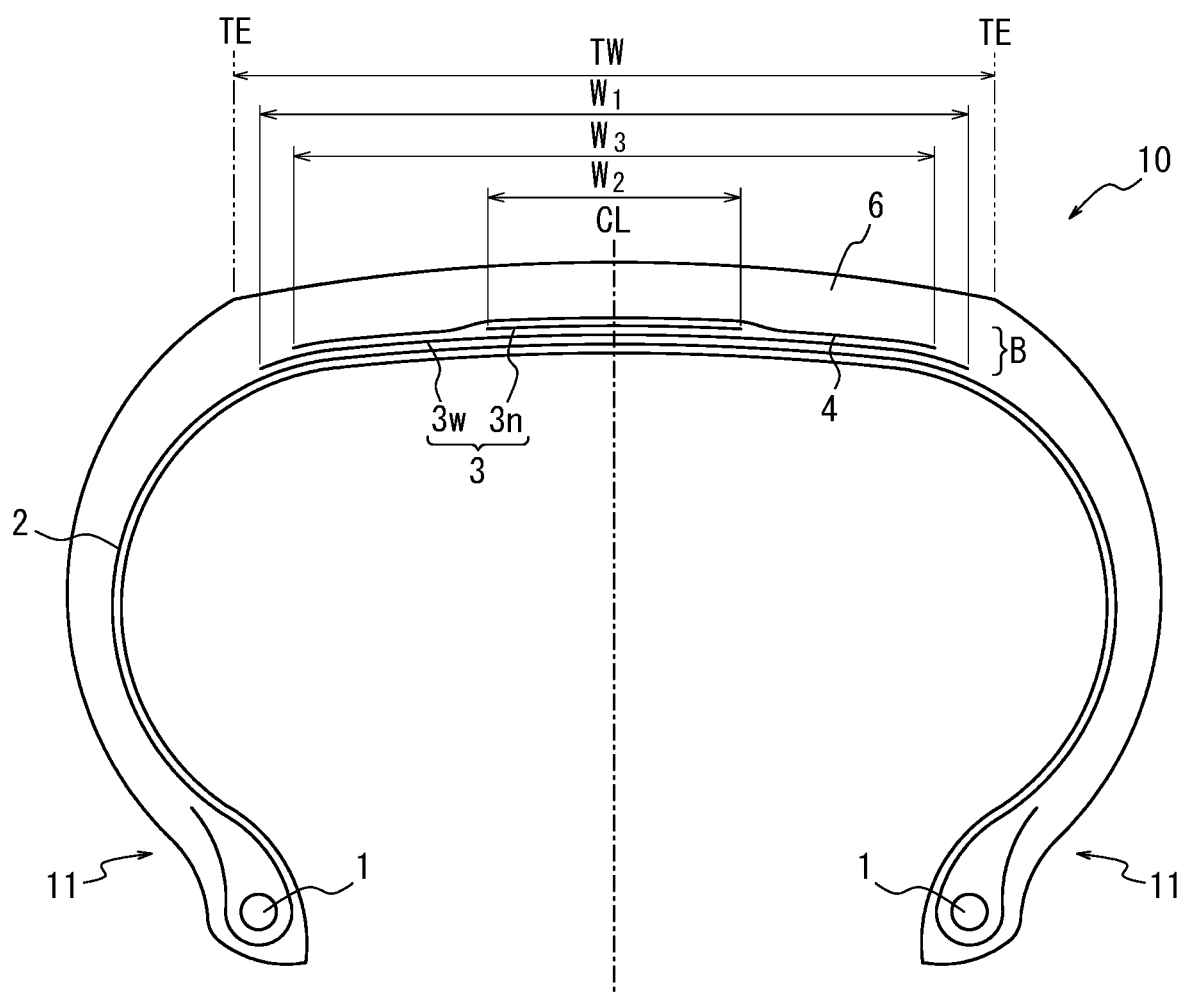
FIG. 1 illustrates a tire widthwise sectional view of a tire according to an embodiment of this disclosure.

Hereinafter, by referring to the drawings, the tire of this disclosure is described in details by exemplifying an embodiment thereof.

FIG. 1 illustrates a tire widthwise section of the tire according to an embodiment of this disclosure. This tire 10 includes a carcass 2, a belt B and a tread 6, the carcass 2 toroidally extending between a pair of bead portions 11, the bead portions 11 respectively including a bead core 1, the belt B including inclined belt layers 3 (in the drawing, two inclined belt layers 3w, 3n) and a circumferential belt layer 4 (one layer in the drawing) on a tire radial outer side of a crown portion of the carcass 2, the inclined belt layers 3 having cords extending inclined with respect to a tire circumferential direction, the circumferential belt layer 4 having and cords extending along the tire circumferential direction. More specifically, tire widthwise widths of the two inclined belt layers 3 are different to each other, and the belt layer 3n having a narrowest width, of which the tire widthwise width is $W_2$, is located on a circumferential outer side of the inclined belt layer 3w having a widest width, of which the tire widthwise width is $W_1$.

Here, in the tire of this disclosure, it is important that the correlation X≥750 is satisfied when it is defined that X=Y× n×m, where Y is the Young's modulus (GPa) of the cords in the circumferential belt layer 4, n is the number of the cords per 50 mm of tire widthwise width, and m is the number of layers.

By adjusting the aforementioned factors so as to satisfy the correlation X≥750, not only flexural stiffness within a surface of the circumferential belt layer 4, but also ring stiffness of the tire is improved, therefore it is possible to increase the cornering power.

However, as mentioned above, in such tire having improved ring stiffness and increased cornering power, degree of exhibited cornering power is likely to depend on a load applied to the tire.

Therefore, in addition to satisfying the aforementioned relation expression, it is important to have at least two inclined belt layers having tire widthwise widths different to each other, of which the tire widthwise width $W_1$ of the inclined belt layer 3w having the widest width and the tire widthwise width $W_2$ of the inclined belt layer 3n having the narrowest width satisfy the correlation $W_2 \leq 0.6\ W_1$.

Figure 6A:
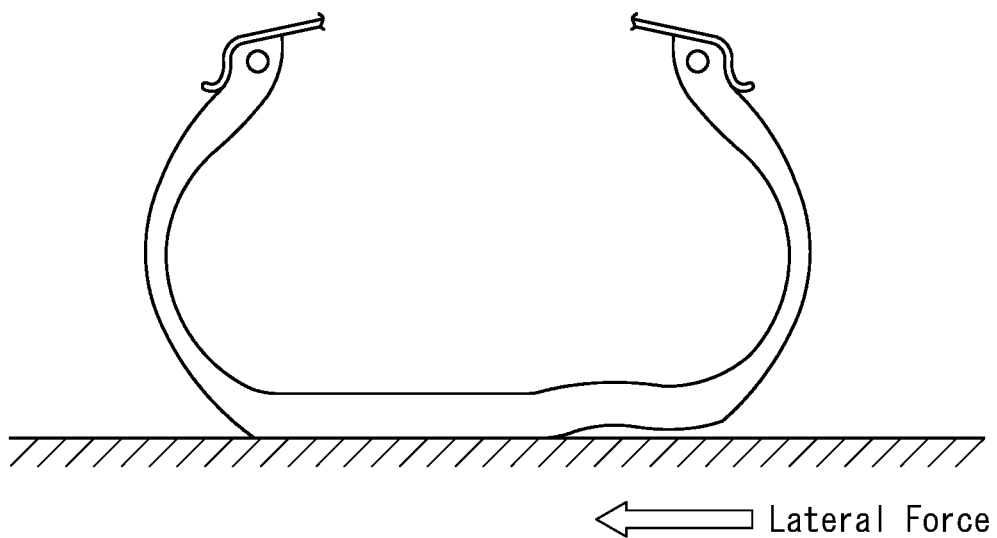
FIG. 6A illustrates a phenomenon that a tread rises in a comparative example tire.

Ordinarily, a lateral force generated during cornering of a vehicle is absorbed in a tread rubber portion of the tread 6, a tread surface of the tread 6 is strongly pushed to the road surface, and thereby, a cornering power is obtained. Therefore, with respect to tire circumferential stiffness of the tire, in the case where insufficient load is applied to the tire, the tread surface of the tread 6 is pushed to the road surface insufficiently, and as illustrated in FIG. 6A, a phenomenon occurs that a shoulder region of the tread 6 rises, and the cornering power is decreased.

Then, between the two inclined belt layers having tire widthwise widths different to each other, by setting the tire widthwise width of one inclined belt layer to a width of 60% or less of the tire widthwise width of the other inclined belt layer, it is possible to appropriately reduce the stiffness in the shoulder region of the tread 6. As a result, in a tire having improved ring stiffness, even in the case where the load on the tire is comparatively small, since it becomes easy to push to the road surface the entire tread surface of the tread 6 inclusive of the shoulder region of the tread 6, it is possible to suppress the phenomenon that the tread 6 partially rises above the road surface. Namely, it is possible to reduce the load dependence of the cornering power.

The range $W_2 \leq 0.6\ W_1$ is used for the reason that: if the tire widthwise width $W_2$ of the inclined belt layer 3n having the narrowest width is more than 60% of the tire widthwise width $W_1$ of the inclined belt layer 3w having the widest width, the reduction effect to the stiffness in the shoulder region of the tread 6 is insufficient, and thus it becomes difficult to suppress the phenomenon that the shoulder region in the tread 6 rises when the load on the tire is small.

Moreover, by using the range $W_2 \leq 0.6\ W_1$, the tire weight is reduced, and thus it is possible to reduce the rolling resistance of the tire as well.

In the embodiment as illustrated in FIG. 1, between the two inclined belt layers, the tire widthwise width of the inclined belt layer on the tire radial outer side is set smaller than the inclined belt layer on the tire radial inner side, while on the other hand, the tire widthwise width of the inclined belt layer on the tire radial outer side may be set larger than the inclined belt layer on the tire radial inner side as well. Further, the inclined belt layers may be 3 or more as well. In this case, if the tire widthwise width $W_1$ of the inclined belt layer having the widest width and the tire widthwise width $W_2$ of the inclined belt layer having the narrowest width satisfy the correlation $W_2 \leq 0.6\ W_1$, inclined belt layers having the same width may be included as well.

In the tire of this disclosure, the tire widthwise width $W_1$ of the inclined belt layer 3w having the widest width and the tire widthwise width $W_2$ of the inclined belt layer 3n having the narrowest width preferably satisfy the correlation $W_2 \geq 0.25\ W_1$.

If the tire widthwise width $W_2$ of the inclined belt layer 3n having the narrowest width is too narrow, it becomes impossible to ensure sufficient belt stiffness, and the increase effect to the cornering power is deteriorated. By disposing the inclined belt layer 3n having the narrowest width which satisfies $W_2 \geq 0.25\ W_1$, it is possible to suppress the phenomenon of rise of the tread 6, without reducing the cornering power which is increased by improving the ring stiffness of the tire.

Therefore, in the case where the tire widthwise width $W_1$ of the inclined belt layer having the widest width and the tire widthwise width $W_2$ of the inclined belt layer having the narrowest width satisfy the correlation $0.25\ W_1 \leq W_2 \leq 0.6\ W_1$, it is possible to sufficiently increase the cornering power and further securely suppress the phenomenon of rise of the tread 6, to thereby reduce the load dependence of the cornering power.

It is more preferable that $W_2 \geq 0.4\ W_1$ from the viewpoint of not inhibiting the increase effect to the cornering power, and more preferable that $W_2 \leq 0.55 W_1$ from the viewpoint of reducing the load dependence of the cornering power.

Figure 2:
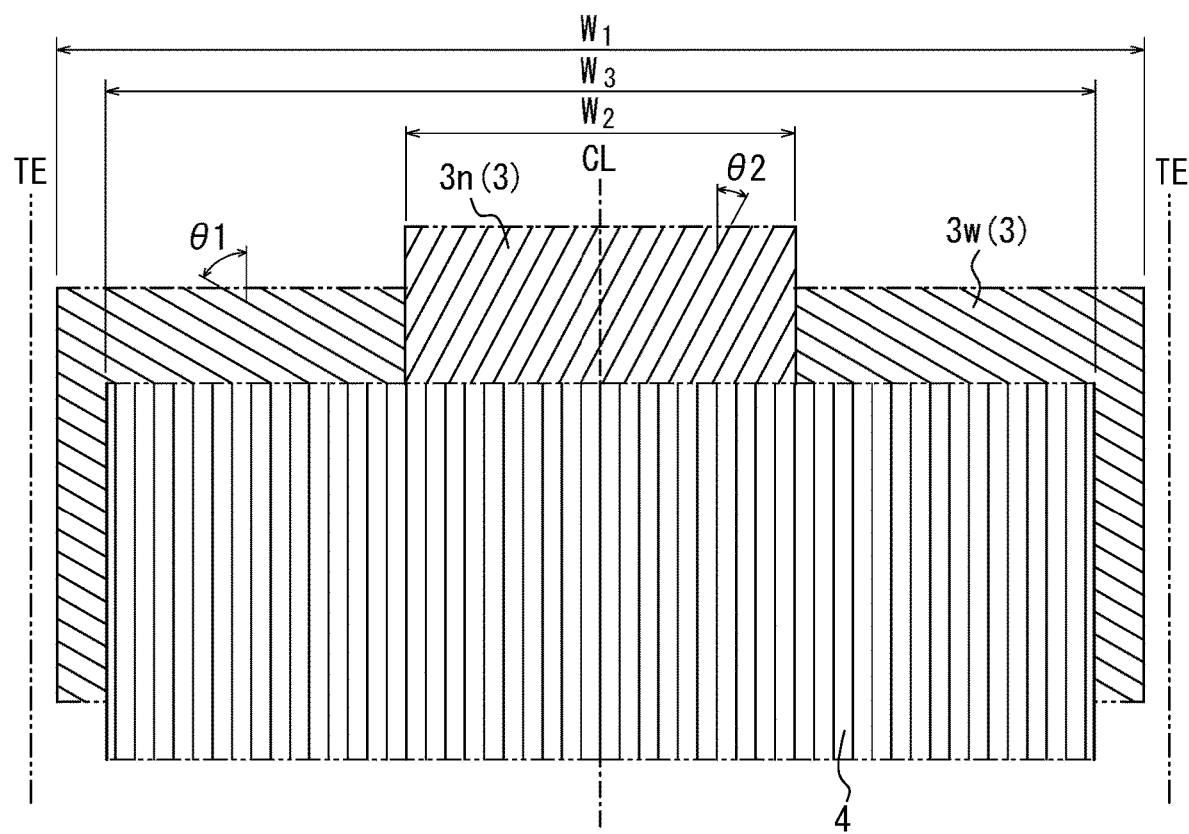
FIG. 2 illustrates a belt structure of the tire of FIG. 1.

FIG. 2 illustrates a planar view of the structure of the belt B of the tire 10 as illustrated in FIG. 1. As mentioned above, on a circumferential outer side of the carcass 2 (not illustrated), the inclined belt layer 3w having the widest width and the inclined belt layer 3n having the narrowest width overlap the circumferential belt layer 4 in a manner such that tire widthwise center lines of these belt layers are located on a tire equatorial plane CL.

In the tire of this disclosure, preferably, the inclination angle $\theta_1$ with respect to the tire circumferential direction of the cords in the inclined belt layer 3w having the widest width is $30° \leq \theta_1 \leq 85°$, and the inclination angle $\theta_2$ with respect to the tire circumferential direction of the cords in the inclined belt layer having the narrowest width is $10° \leq \theta_2 \leq 30°$, which satisfies $\theta_1 > \theta_2$.

By setting the inclination angle $\theta_1$ with respect to the tire circumferential direction of the cords in the inclined belt layer 3w having the widest width to 30° or more, an elongation in the circumferential direction of the rubber when the tread surface of the tread 6 is deformed. Therefore, it is possible to ensure the contact length of the tire, and as a result, the cornering power is further increased. Further, from the viewpoint of ensuring the circumferential flexural stiffness, an upper limit of the inclination angle $\theta_1$ is set to 85°.

Figure 5:
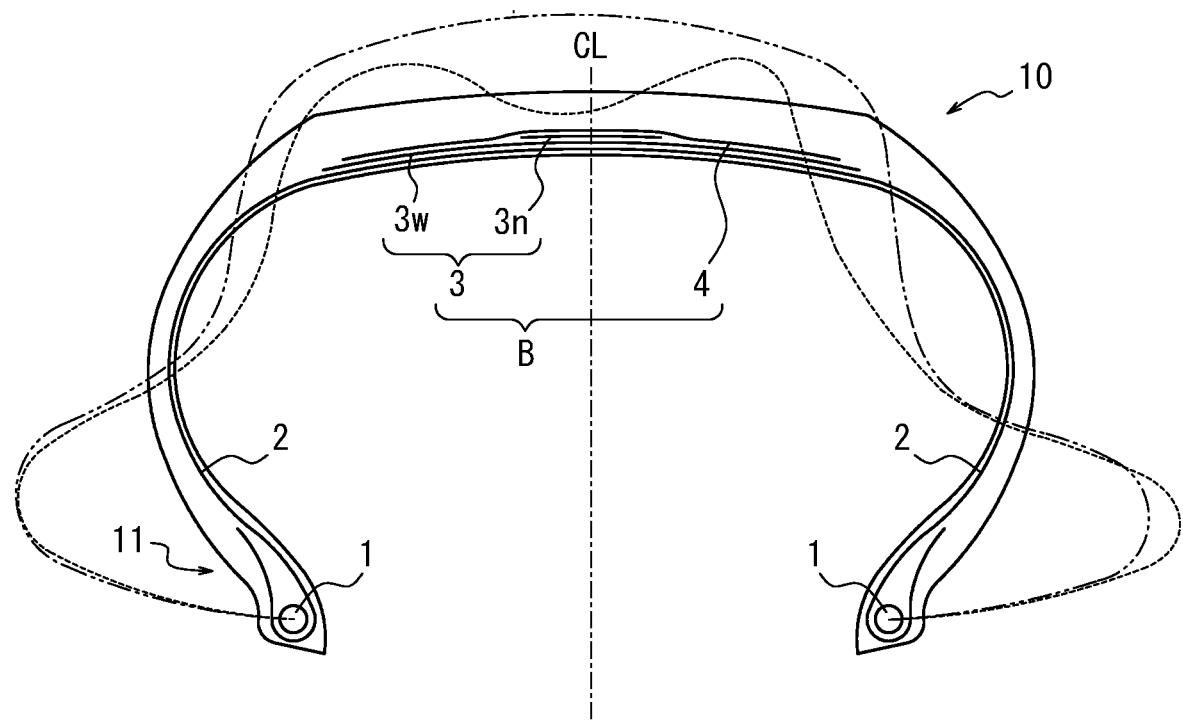
FIG. 5 illustrates the effect due to a preferable configuration of this disclosure.

However, if the inclination angle $\theta_1$ with respect to the tire circumferential direction of the cords in the inclined belt layer 3w having the widest width is set to such large value, vehicle exterior noise performances tend to be deteriorated due to variation of vibration mode of the tire. More specifically, in a high frequency region of 400 Hz to 2 k Hz, most tires having cords of an inclined belt layer inclined at an angle with respect to a tire circumferential direction of 30° or more and 85° or less are deformed into a shape such that a tread surface vibrates at the same degree (illustrated with dashed line in FIG. 5) in primary, secondary, tertiary, etc. vibration modes in a sectional direction. Therefore, a large noise emission is generated.

Such noise emission probably becomes a problem in a tire for a passenger vehicle, which is assumed to be used in high speed driving for 60 km or more, and is highly requested of noise performances by customers.

Then, among the plurality of belt layers 3, by setting the inclination angle $\theta_2$ with respect to the tire circumferential direction of the cords in the inclined belt layer 3n having the narrowest width to be less than the inclination angle $\theta_1$ with respect to the tire circumferential direction of the cords in the inclined belt layer 3w having the widest width, and setting $\theta_2$ to 10° or more and 30° or less, an out-of-plane bending stiffness in the tire circumferential direction in a vicinity of the tire equatorial plane is maintained appropriately. Therefore, it is possible to improve the aforementioned variation in vibration mode, and to suppress deterioration in vehicle exterior noise performances. Namely, as a result of suppressing expansion of the tread 6 to the tire circumferential direction in the vicinity of the tire equatorial plane, it is possible to reduce noise emission (illustrated with dashed line in FIG. 5).

By setting the inclination angle $\theta_2$ to 10° or more, it is possible to maintain the out-of-plane bending stiffness in the tire circumferential direction, without inhibiting the effect of ensuring the contact length in the inclined belt layer 3w having the widest width. Moreover, by setting the inclination angle $\theta_2$ to 30° or less, it is possible to securely suppress the aforementioned deterioration in vehicle exterior noise performances.

Further, from the viewpoint of increasing the cornering power and suppressing deterioration in vehicle exterior noise performances, it is more preferable to use the range that $30° \leq \theta_1 \leq 45°$ and $15° \leq \theta_2 \leq 25°$.

In the tire of this disclosure, the inclined belt layer 3 preferably consists of only two layers, which are an inclined belt layer having a wider width (3w in the example of FIG. 2) and an inclined belt layer having a narrower width (3n in the example of FIG. 2). In summary, in a tire for passenger vehicle, since a requirement level to durability is not as high as, e.g., heavy-duty tire, it is possible to ensure sufficient durability even in a belt structure having two inclined belt layers. Further, it becomes possible to reduce the weight of the tire.

Figure 7:
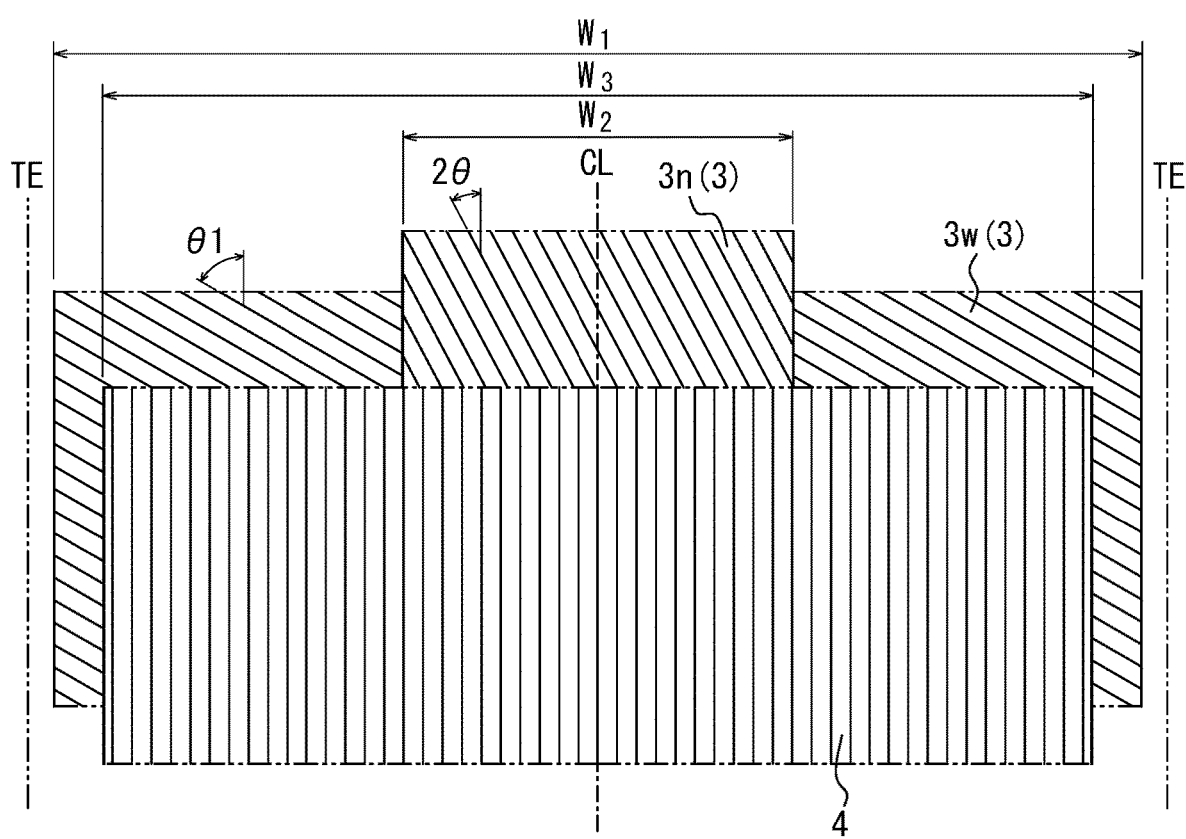
FIG. 7 exemplifies another mode of the belt structure of the tire of FIG. 1.

In the example illustrated in FIG. 2, extending directions of the cords of the inclined belt layers 3n and 3w are opposite to each other (namely, in FIG. 2, the cords of the inclined belt layer 3n extends in a direction rising up to the right, and the inclined belt layer 3w extends in a direction rising up to the left), while on the other hand, as illustrated in FIG. 7, it is possible as well to set the extending directions of the cords of all the belt layers (two in the example of FIG. 2) to the same direction (a direction rising up to the left in the example of FIG. 7).

As illustrated in FIG. 2, by setting the extending directions of the cords of the inclined belt layers 3n and 3w to directions opposite to each other, a shear force is applied between the two inclined belt layers during cornering of a vehicle. Therefore, it is possible to obtain particularly excellent cornering power.

Moreover, as illustrated in FIG. 7, by setting the extending directions of the cords of the inclined belt layers 3n and 3w to the same direction, the shear force applied between the two inclined belt layers is decreased. Therefore, it is possible to obtain particularly excellent rolling resistance.

The expression "extending directions of the cords being the same" used here does not mean the inclination angles of the cords with respect to the tire equatorial plane CL are the same, but means that all cords of a plurality of inclined belt layers rise up to the right or rise up to the left, in a planar view of the tread.

Figure 3:
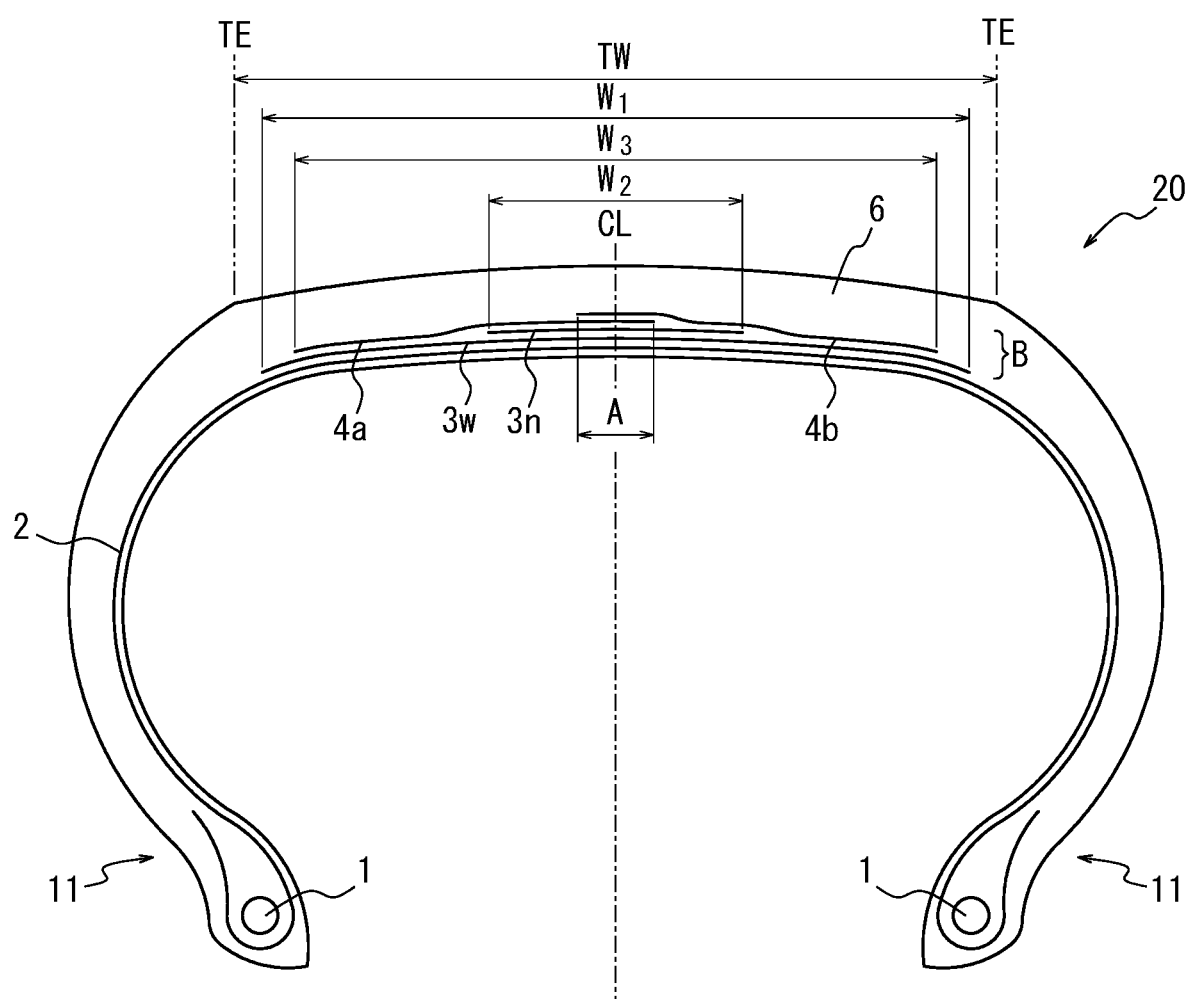
FIG. 3 illustrates a tire widthwise sectional view of a tire according to another embodiment of this disclosure.

Next, FIG. 3 illustrates a tire widthwise section of a tire according to another embodiment of this disclosure. The points which are the same to the aforementioned embodiment are omitted in the description.

This tire 20 includes a belt B and a tread 6 on a tire radial outer side of a carcass 2 toroidally extending between bead portions 11, the belt B including belt layers 3 (two inclined belt layers 3w and 3n in the drawing) and a circumferential belt layer 4 (circumferential belt layers 4a and 4b separated in the tire width direction in the drawing).

Figure 4:
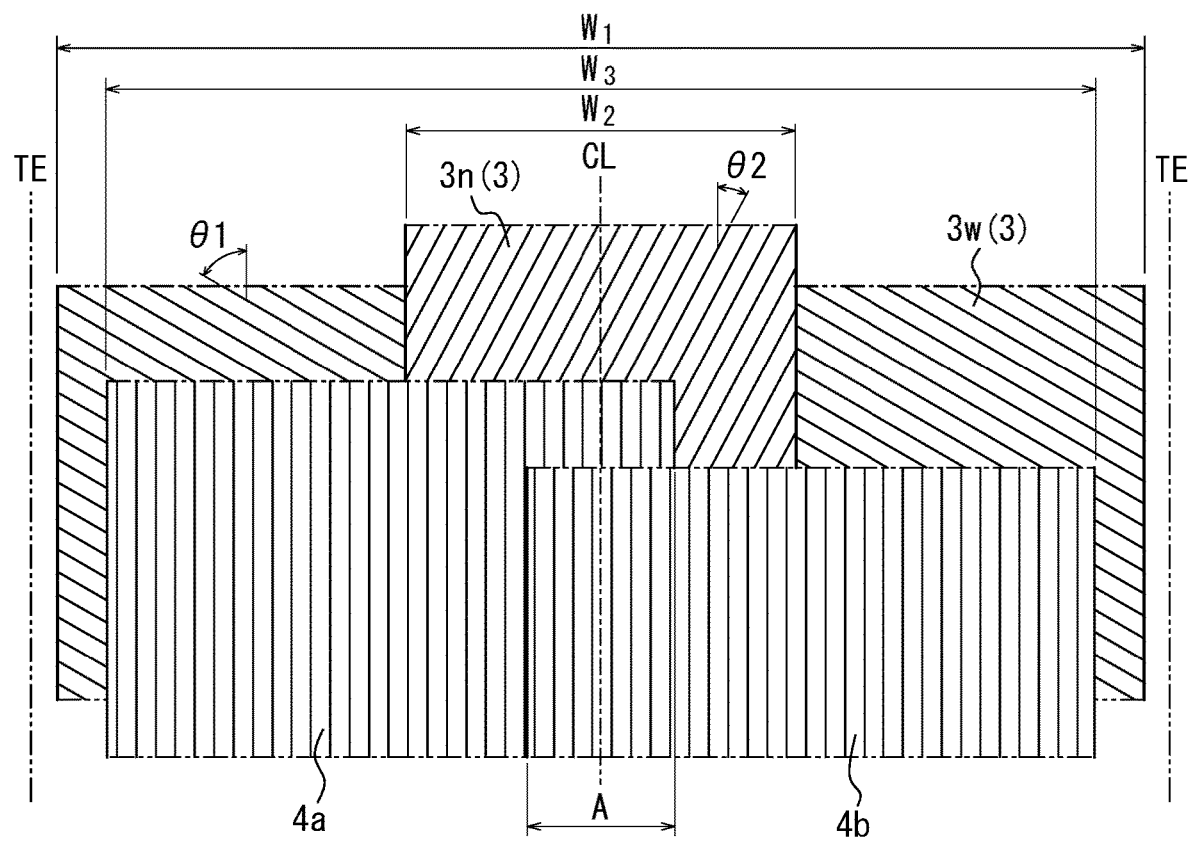
FIG. 4 illustrates a belt structure of the tire of FIG. 3.

Referring to FIG. 4, which illustrates the structure of the belt B of the tire 20 in a planar view, on a circumferential outer side of an inclined belt layer 3 of the tire 20, a circumferential belt layer 4a, which extends from a vicinity of a tread edge TE to a tire equatorial plane CL and terminates beyond the tire equatorial plane CL, is disposed on one side, and a circumferential belt layer 4b, which extends from the tread edge TE to the tire equatorial plane and terminates in a manner overlapping an end portion of the circumferential belt layer 4a in a tire radial direction, is disposed on the other side. Note that although being disposed symmetrically with respect to the tire equatorial plane in the drawing, the circumferential belt layers 4a and 4b may be disposed asymmetrically as well.

In this way, the tire of this disclosure may optionally have more circumferential belt layers in the vicinity of the tire equatorial plane than in the other regions. This is based on advantage for tire manufacture.

Further, in the case where a plurality of circumferential belt layers overlap each other as illustrated in FIG. 3, a tire widthwise length A of an overlapping portion is preferably 30 mm or less from the viewpoint of suppressing reduction in the contact length. Note that by increasing circumferential belt layers in the vicinity of the tire equatorial plane, it becomes possible to contribute to the circumferential stiffness and thereby suppress a vibration mode which leads to deterioration in noise performances, and thus the length A may be set to 30 mm or more, as long as not approximately overlapping the entire circumferential belt layer in the tire width direction.

From the viewpoint of advantage for manufacture, aside from the aforementioned overlapping portion having the tire widthwise length A, the circumferential belt layers may overlap within a range of 30 mm or less in a tire widthwise outer side end portion of the circumferential belt layer 4.

Referring to FIGS. 1 to 4, in this disclosure, the tire widthwise width $W_3$ of the circumferential belt layer 4 is preferably narrower than the tire widthwise width $W_1$ of the inclined belt layer 3w having the widest width. In the case where a tire widthwise width $W_3$ of a high-stiffness circumferential belt layer is larger than the tire widthwise width $W_1$ of the inclined belt layer having the widest width, the circumferential belt layer 4 and the carcass 2 become adjacent to each other in the tire radial direction. This is because that in this case, when the tread 6 contacts the ground, a distortion is generated between the carcass tending to extend in the tire circumferential direction and the circumferential belt layer tending to suppress the elongation to the tire circumferential direction, which leads to a tendency of deterioration in the rolling resistance.

The tire widthwise width $W_3$ of the circumferential belt layer 4 is preferably 90% or more and 115% or less of a tread width TW, from the viewpoint of maintaining the ground contact area, and the tire widthwise width $W_1$ of the inclined belt layer 3w having the widest width is preferably 90% or more and 115% or less of the tread width, from the viewpoint of durability.

Here, the tread width TW refers to a contact width when the tire is mounted to an applicable rim, with a predetermined air pressure filled and a load corresponding to a maximum load capability applied.

In the circumferential belt layer 4, cords containing aramid, a hybrid cords of aramid and nylon, etc. may be used, and in the inclined belt layer 3, a steel cord, etc. may be used.

In the belt structure illustrated in FIG. 4, extending directions of the cords of the inclined belt layers 3n and 3w are opposite to each other (namely, in FIG. 4, the cords of the inclined belt layer 3n extend in a direction rising up to the right, and the inclined belt layer 3w extends in a direction rising up to the left), while on the other hand, although not illustrated, it is possible as well to set the extending directions of the cords of all the belt layers (two in the example of FIG. 4) to the same direction, in the same way as the belt structure as illustrated in FIG. 7. The aforementioned effect is obtained by setting the extending directions of the cords of the inclined belt layer to be the same or different to each other.

Further, the tire of this disclosure is preferable used as a pneumatic tire for passenger vehicle from the viewpoint of suppressing diameter increase during high speed driving via the circumferential belt layer.

The belt structure of this disclosure is particularly preferable to be applied to a pneumatic radial tire for passenger vehicles, in which when an internal pressure is 250 kPa or more, a ratio of a sectional width SW to an outer diameter OD of the tire SW/OD is 0.26 in the case where the sectional width SW of the tire is less than 165 mm, and the sectional width SW and an outer diameter OD of the tire satisfy a relation expression that OD≥2.135×SW+282.3 in the case where the sectional width SW of the tire is 165 mm or more.

As for a tire satisfying the aforementioned ratio and relation expression, namely a tire having a narrower width and larger diameter as compared to a conventional pneumatic tire for passenger vehicle, although the rolling resistance is greatly improved, since the tread has a narrower width, the cornering power tends to be insufficient. By applying the configuration of this disclosure, it is possible to increase the cornering power, which is preferable.

EXAMPLES

Examples of this disclosure are described hereinafter.

Tires of examples and comparative examples (both having a tire size of 165/60R19) were manufactured experimentally, and cornering power, rolling resistance and noise resistance thereof were evaluated.

Each sample tire was a tire including a belt and a tread, the belt having a carcass toroidally extending between a pair of bead portions, and having two inclined belt layers and one or more circumferential belt layers on a tire radial outer side of a crown portion of the carcass.

(Cornering Power)

Each sample tire was installed to a rim (having a size of 5.5J-19) and applied with an internal pressure of 300 kPa, and then was mounted to a vehicle and measured on a flat belt cornering machine. Here, the obtained cornering power was measured at a belt speed of 100 km/h and under 3 different load conditions, namely, under a load condition corresponding to a maximum load capability at applicable size and ply rating, under a load condition equal to 70% of the same, and under a load condition equal to 40% of the same.

The results were as shown in Table 1. The results were obtained via index evaluation, with the cornering power of the tire at 70% applied load of Comparative Example Tire 1 as 100. Larger index means larger cornering power. Here, by referring to $(\alpha-\gamma)/\beta$ (%) in the table, it is possible to know the degree of load dependence of cornering power. Lower value means lower load dependence.

(Rolling Resistance)

Each sample tire was mounted to a vehicle under the same conditions as mentioned above, and the rolling resistance thereof was measured on a running test drum by rolling the drum at a speed of 100 km/h. The results were as shown in Table 1. The results were obtained via index evaluation with the rolling resistance of Comparative Example Tire 1 as 100. Here, smaller index means more excellent rolling resistance.

(Vehicle Exterior Noise Performance)

Each sample tire was mounted to a vehicle under the same conditions as mentioned above, and the noise level thereof was measured on a running test drum by rolling the drum at a speed of 100 km/h, via a mobile microphone. The results were as shown in Table 1. The results were evaluated by the difference in the noise level as compared with Comparative Example Tire 1. Lower value stands for more excellent noise reduction effect.

TABLE 1

Figure 6B:
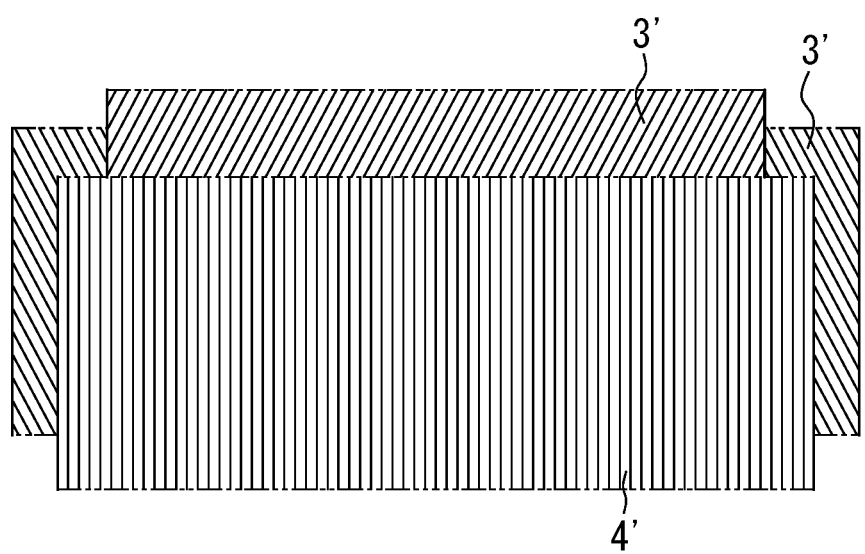
FIG. 6B illustrates a belt structure of a comparative example tire.

| | | Comparative Example 1 | Comparative Example 2 | Example 1 | Example 2 | Example 3 | Comparative Example 3 | Example 4 | Example 5 | Example 6 | Example 7 |
|---|---|---|---|---|---|---|---|---|---|---|---|
| Belt structure | | FIG. 6B | FIG. 6B | FIG. 2 | FIG. 2 | FIG. 2 | FIG. 2 | FIG. 2 | FIG. 2 | FIG. 2 | FIG. 4 |
| Inclined belt layer having widest width | $W_1$ (mm) | 135 | 135 | 135 | 135 | 135 | 135 | 135 | 135 | 135 | 135 |
| | $\theta_1$ (°) | 28 | 28 | 28 | 28 | 40 | 60 | 60 | 60 | 60 | 60 |
| Inclined belt layer having narrowest width | $W_2$ (mm) | 130 | 130 | 65 | 30 | 65 | 65 | 40 | 74 | 65 | 65 |
| | $\theta_2$ (°) | 28 | 28 | 28 | 28 | 16 | 25 | 16 | 16 | 60 | 16 |
| | $W_2/W_1$ | 0.96 | 0.96 | 0.48 | 0.22 | 0.48 | 0.48 | 0.30 | 0.55 | 0.48 | 0.48 |
| Circumferential belt layer | X ($Y*n*m$) | 500 | 950 | 950 | 950 | 950 | 950 | 950 | 950 | 950 | 950 |
| | Y (GPa) | 10 | 19 | 19 | 19 | 19 | 19 | 19 | 19 | 19 | 19 |
| | n (/50 mm) | 50 | 50 | 50 | 50 | 50 | 50 | 50 | 50 | 50 | 50 |
| | m (layers) | 1 | 1 | 1 | 1 | 1 | 1 | 1 | 1 | 1 | 1 |
| | $W_3$ (mm) | 128 | 128 | 128 | 128 | 128 | 128 | 128 | 128 | 128 | 128 |
| | Material | Nylon | Hybrid cord | Hybrid cord | Hybrid cord | Hybrid cord | Hybrid cord | Hybrid cord | Hybrid cord | Hybrid cord | Hybrid cord |
| Contact width (mm) | | 124 | 128 | 122 | 121 | 130 | 130 | 130 | 130 | 130 | 130 |
| Cornering power (INDEX) | Applied Load α 100% | 130 | 150 | 140 | 135 | 142 | 146 | 141 | 147 | 150 | 145 |
| | Applied Load β 70% | 100 | 110 | 105 | 101 | 104 | 106 | 104 | 107 | 115 | 110 |
| | Applied Load γ 40% | 70 | 65 | 70 | 70 | 76 | 72 | 75 | 73 | 75 | 75 |
| | (α − γ)/β (%) | 60% | 77% | 67% | 64% | 63% | 70% | 63% | 69% | 65% | 64% |
| Rolling resistance (INDEX) | | 100 | 96 | 93 | 90 | 93 | 92 | 92 | 95 | 86 | 89 |
| Vehicle exterior noise performance (dB) | | — | — | 0 | — | +1 | +2 | +1.5 | +2 | +3 | +1 |

In each one of Example Tires 1 to 7, the cornering power was increased and the load dependence thereof was reduced.

REFERENCE SIGNS LIST

1 bead core
2 carcass
3, 3' inclined belt layer
3w inclined belt layer having widest width
3n inclined belt layer having narrowest width
4, 4', 4a, 4b circumferential belt layer
6 tread
10, 20 tire
11 bead portion
B belt
CL tire equatorial plane
TE tread end
TW tread width

The invention claimed is:
1. A tire comprising:
a carcass toroidally extending between a pair of bead portions; and
inclined belt layers having cords inclined with respect to a tire circumferential direction and two circumferential belt layers, each circumferential belt layer having cords extending along the tire circumferential direction, the inclined belt layers being disposed on and adjacent to a tire radial outer side of a crown portion of the carcass and the two circumferential belt layers being disposed on a tire radial outer side of a crown portion of the inclined belt layers, wherein:

the two circumferential belt layers each satisfy a correlation that $X \geq 750$ when it is defined that $X = Y \times n \times m$, where Y is a Young's modulus in GPa of the cords forming the circumferential belt layer, n is a number of the cords implanted per 50 mm of width, and m is a number of layers of each circumferential belt layer;
the inclined belt layers comprise at least two inclined belt layers having different tire widthwise widths;
a tire widthwise width $W_1$ of an inclined belt layer having a widest width and a tire widthwise width $W_2$ of an inclined belt layer having a narrowest width satisfy a correlation that $W_2 \leq 0.6 W_1$, the inclined belt layer having the widest width, the inclined belt layer having the narrowest width, and the two circumferential belt layers are disposed in this order from a tire radial inner side to the tire radial outer side;
each of the two circumferential belt layers is located on a tire equatorial plane;
a first circumferential belt layer of the two circumferential belt layers is disposed on a first side of a tread edge wherein the first circumferential belt layer extends from a vicinity of the first side of the tread edge to a tire equatorial plane and terminates beyond the tire equatorial plane at a first end portion; and a second circumferential belt layer of the two circumferential belt layers is disposed on a second side of the tread edge, the second side of the tread edge being on an opposite side of the tread edge than the first side of the tread edge, wherein the second circumferential belt layer extends from a vicinity of the second side of the tread edge to the tire equatorial plane and terminates in a manner overlapping the first end portion of the first circumferential belt layer.

2. The tire according to claim 1, wherein the tire satisfies a correlation that $W_2 \geq 0.25 W_1$.

3. The tire according to claim 1, wherein the tire satisfies correlations that $$30° \leq \theta_1 \leq 85°,$$

$$10° \leq \theta_2 \leq 30°, \text{ and}$$

$$\theta_1 > \theta_2,$$

where $\theta_1$ is an inclination angle with respect to the tire circumferential direction of the cords forming the inclined belt layer having the widest width, and $\theta_2$ is an inclination angle with respect to the tire circumferential direction of the cords forming the inclined belt layer having the narrowest width.

4. The tire according to claim 1, wherein the inclined belt layers consist of only a wide-width inclined belt layer and a narrow-width inclined belt layer.

5. The tire according to claim 1, wherein, when the internal pressure of the tire is 250 kPa or more, a ratio of a sectional width SW to an outer diameter OD of the tire SW/OD is 0.26 in the case where the sectional width SW of the tire is less than 165 mm, and the sectional width SW and an outer diameter OD of the tire satisfy a relation expression that $OD \geq 2.135*SW+282.3$ in the case where the sectional width SW of the tire is 165 mm or more.

6. The tire according to claim 1, wherein the cords of the two circumferential belt layers comprise cords containing aramid, or hybrid cords of aramid and nylon.

7. The tire according to claim 1, wherein the tire widthwise width of the two circumferential belt layers together, as measured from the first side of the tread edge to the second side of the tread edge, is 90% or more and 115% or less of a tread width.

8. The tire according to claim 1, wherein the tire widthwise width of the two circumferential belt layers together, as measured from the first side of the tread edge to the second side of the tread edge, is smaller than the tire widthwise width of the inclined belt layer having the widest width and larger than the tire widthwise width of the inclined belt layer having the narrowest width.

* * * * *